United States Patent

[11] 3,626,809

| [72] | Inventor | Donald L. Pieper<br>Schenectady, N.Y. |
|---|---|---|
| [21] | Appl. No. | 76,562 |
| [22] | Filed | Sept. 29, 1970 |
| [45] | Patented | Dec. 14, 1971 |
| [73] | Assignee | General Electric Company |

[54] BILATERAL SERVOSYSTEM
5 Claims, 4 Drawing Figs.

[52] U.S. Cl. .................................................. 91/363 R,
91/434
[51] Int. Cl. .................................................. F15b 9/03,
F15b 9/09, F15b 13/14
[50] Field of Search .................................. 91/434, 363
R, 363 A

[56] References Cited
UNITED STATES PATENTS
3,168,203  2/1965  Gallistel .................... 91/434

| 3,263,824 | 8/1966 | Jones et al. ................... | 91/363 R |
| 3,411,410 | 11/1968 | Westbury et al. .............. | 91/363 A |
| 3,528,454 | 9/1970 | Lewis ........................... | 91/434 |

*Primary Examiner*—Paul E. Maslousky
*Attorneys*—Paul A. Frank, John F. Ahern, Julius J. Zaskalicky, Frank L. Neuhauser, Oscar B. Waddell and Joseph B. Forman ABSTRACT: A single control valve is utilized in the slave loop and in the master force feedback loop of the system. Instabilities in the master loop resulting from the high gain required in the slave loop and inherently existing therein in relation to the slave loop are eliminated by utilization of phase lag and phase lead networks in the master loop. Slew error in the system resulting from the use of such networks is minimized by the provision of phase lag and phase lead networks in the slave loop.

Inventor
Donald L. Pieper
by [signature]
His Attorney

Inventor
Donald L. Pieper,
by *his attorney signature*
His Attorney

Inventor
Donald L. Pieper
by [signature]
His Attorney

BILATERAL SERVOSYSTEM

The present invention relates to bilateral servosystems utilizing a single control valve for moving a slave member into correspondence with a master member and for reflecting force applied by the slave member back to the master member reduced in magnitude but opposite in direction to the initiating force.

One such single valve bilateral servosystem includes a master member, an electromechanical transducer mechanically coupled to the master member to produce an electrical output in accordance with the movement of the master member, an amplification channel including an electronic amplifier and a fluid control valve, a slave member, another electromechanical transducer mechanically coupled to the slave member to produce an electrical output in accordance with movement of the slave member and a slave actuator. The amplification channel is responsive to a difference in outputs from the transducers to develop a pressure differential at the output thereof. Such pressure output from the control valve drives the slave actuator which in turn causes slave member to move in a direction to bring it into correspondence with the master member, that is reduce the difference in signals from the transducers to zero. Such a system also includes a master actuator responsive to the same pressure differential as the slave actuator but having smaller actuator area and therefore developing a smaller force. The master actuator is oriented so as to provide force to the master member in a direction opposed to direction of movement which produce the force on the slave member.

In such a system the moment of inertia of the slave member is large in relation to the moment of inertia of the master member. In order to provide good compliance, that is, small slave-to-master desynchronization error to support a load, it is necessary to provide high gain in the slave loop and in particular high gain in the amplification channel. The required high gains with the necessary stabilization can be provided in the slave loop, for example by the provision of a feedback path or paths in the amplification channel which introduces the desired slope in the gain versus frequency response of the slave servo loop. In effect, the gain and phase relationships as a function of frequency of the slave loop are designed to avoid regenerative feedback which would produce oscillations and other instabilities in the loop. When the slave loop is so designed, the master loop including the master actuator and the common amplification channel also has high gain. As a matter of fact, it is much higher usually by several orders of magnitude than the gain of the slave loop and usually results in an unstable master loop. The master loop is stabilized by providing in the master loop at the output of the electromechanical transducer a phase network which provides a phase lag in the signal from the transducer over a low-frequency range and also which provides a phase lead over a higher frequency range whereby the phase margin of the master loop at the crossover of the open loop gain versus frequency characteristic of the master loop of the unity gain axis is positive. Such provision, however, augments slew error in the system to an undesirably large value. Slew error is usually represented in terms of angular displacement at one radian per second of slave member from master member to provide a slew rate of one radian per second, i.e., in magnitude it is the reciprocal of the intercept of the ordinate at one radian per second by the open loop gain versus frequency characteristic graph of the loop.

The present invention is directed to the provision of simple and effective means for stabilizing the bilateral servosystems of the kind described above without deteriorating the performance thereof particularly in regard to the introduction of slew error.

When dash pots have been used in the master loop to obtain stabilization, it has been difficult to get the required amount of damping. Also, while orifices provide adequate damping, they introduce slew drag and do not provide adequate force reflection.

Accordingly, an object of the present invention is to provide a stable bilateral servosystem in which the pressure applied to slave actuator can be directly applied to the master actuator using a single servo fluid control valve.

Another object of the present invention is to eliminate slew drag and slew error caused by existing means of stabilizing such a system.

The novel features which are believed to be characteristic of the present invention are set forth in the appended claims.

The invention itself, however, together with further objects and advantages thereof may best be understood by reference to the following description taken in connection with the accompanying drawings in which.

Figure 1:
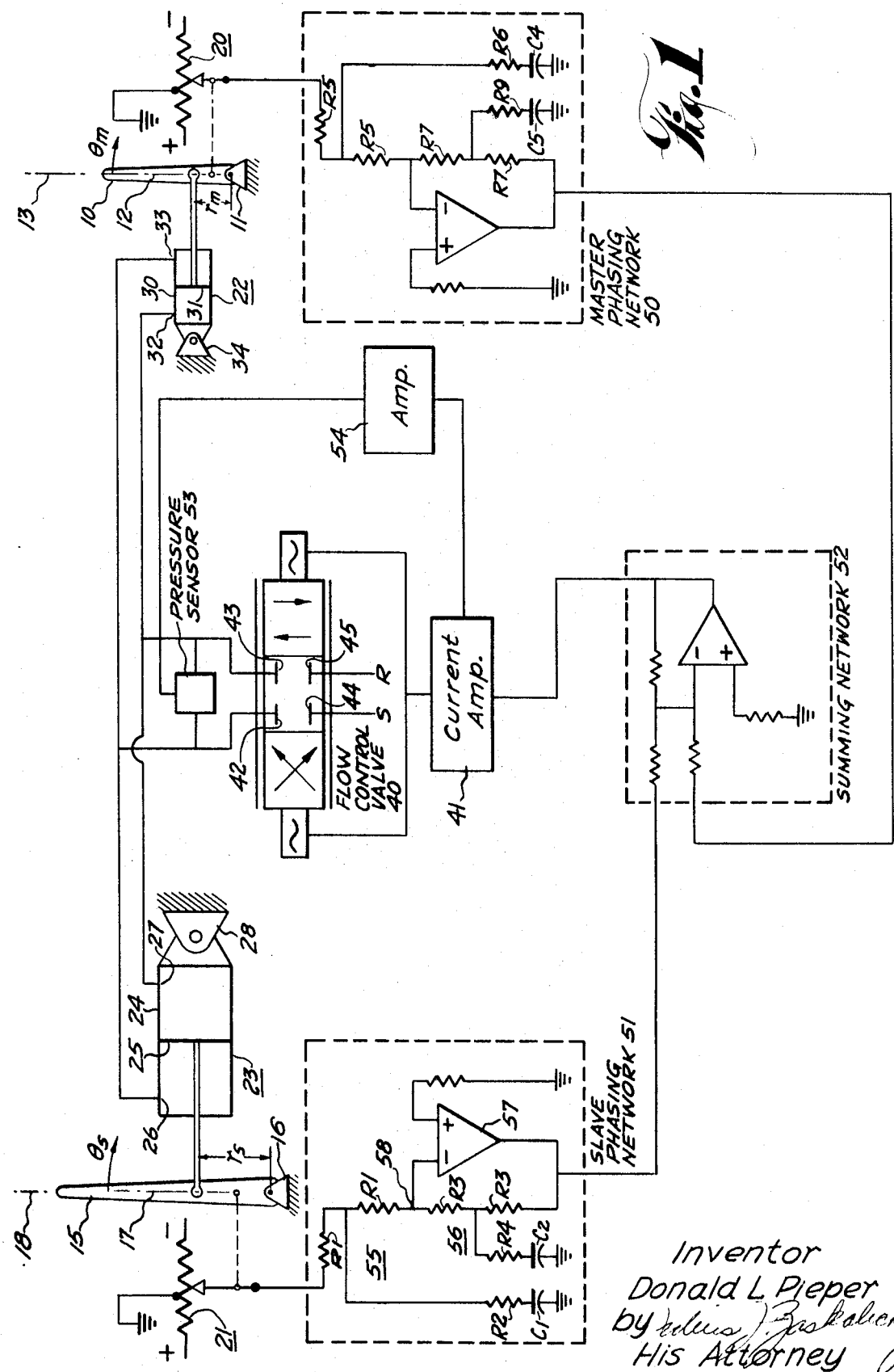
FIG. 1 is a schematic diagram of a bilateral servo system in accordance with the present invention.

Referring now to FIG. 1, there is shown a master member 10 pivoted at one end thereof about a master support member 11 or ground. The longitudinal axis 12 of the master member is aligned along a predetermined axis 13. Also shown is a slave member 15, one end of which is mounted to a slave support member 16 or ground and the other end of which is adapted to apply force and torque to objects. The longitudinal axis of the slave member 17 is aligned along predetermined axis 18. Also provided are a master electromechanical transducer 20, a slave electromechanical transducer 21, a master linear actuator 22 and a slave linear actuator 23. The master electromechanical transducer 20, which may be a potentiometer, is mechanically coupled to the master member 10 to produce an electrical output in accordance with the change in orientation of the axis 12 of the master member in relation to the predetermined axis 13. The slave electromechanical transducer 21 which may also be a potentiometer, is mechanically coupled to the slave member 15 to produce an electrical output in accordance with a change in orientation of the axis 17 of the slave member in relation to the other predetermined axis 18. Outputs from the slave transducer 21 and from the master transducer 21 are matched such that the output from the master transducer corresponding to a predetermined displacement of the axis of the master member from the one predetermined axis and is equal to the output from the slave transducer corresponding to the same predetermined displacement of the axis of slave member from the other predetermined axis. The slave actuator 23 includes a cylinder 24 and a piston 25 movable therein, a pair of ports 26 and 27, one at each end of the cylinder for providing fluid to the ends of the cylinder to cause the piston to move in one direction or the other depending upon the pressure differential applied to the ports. The piston 25 of the slave actuator is pivotally connected to the slave member 15 intermediate the ends thereof and the cylinder 24 is pivotally connected to ground or the support member 28. Accordingly, the application of a fluid pressure differential between the ends of the cylinder causes the slave member to move about its ground support. Master actuator 22 also includes a cylinder 30 and a piston 31 movable therein, a pair of ports 32 and 33, one at each end of the cylinder for providing fluid to the ends of the cylinder to cause the piston to move in one direction or the other. The cylinder 30 is pivotally connected to the support member 34 or ground and the piston 31 is pivotally connected to a point on the master member intermediate the ends thereof.

A fluid flow control valve 40 and a current amplifier 41 which constitute a signal amplification channel provide a pressure differential at the output thereof in response to a difference in signals from the electromechanical transducers 20 and 21. The pressure differential is applied both to the slave and master actuators 22 and 23. The pressure differential applied to the master actuator is directed to oppose the motion of the master member which caused the pressure differential to be developed at the output of the control valve so as to provide a feedback of force to the master member. The electrohydraulic flow control servo valve 40 includes a current input circuit which is connected to the output circuit of the amplifier 41 and a pair of fluid output ports 42 and 43, a pressure source 44 and a fluid return port 45 are also provided and are adapted to be connected respectively to a pressure source S and a fluid return R therefor. The valve 40 provides a flow or pressure output the magnitude and direction of which in respect to the output ports thereof is a function of the magnitude and direction of the current applied to the input circuit of the control valve. The control valve is a Moog-type control valve Series 35 made by Moog Inc. of East Aurora, New York.

The output from the master electromechanical transducer 20 is applied to a phasing network 50 and similarly the output of the slave electromechanical transducer 21 is applied to another phasing network 51. The outputs from the phasing networks 50 and 51 are compared in a comparator or summing network 52 which develops an output, the magnitude and direction of which corresponds to the magnitude and direction of displacement of the slave member with respect to the master member. The output from the summing network 52 is applied to current amplifier 41 and in turn the current output is applied to the current coils of the control valve to develop a displacement in the valve which produces a fluid flow at the output ports thereof which corresponds in magnitude and direction of the input current applied to the valve. To provide stabilization in the common portion of the master and slave loops of the bilateral servosystem, a pressure feedback signal is provided. Electrical signals obtained from a pressure transducer 53 connected across the output ports of the valve 40 is applied through an amplifier 54 to the current amplifier and superimposes a current on the control current produced by the application of signals from the electromechanical transducers 20 and 21 connected to the master and slave members.

The phasing networks 50 and 51 are standard networks and identical in form. (See Chapter 6 of the Control Engineer's Handbook, edited by John G. Truxal, and published by McGraw-Hill (1958). Network 51 includes a pair of T-networks 55 and 56 connected in cascade between the input and output with the vertical leg of the T-networks grounded to a common input and output terminal and an operational amplifier 57 of very high input impedance and high gain with no phase reversal between input and output thereof, such as a type $\mu A747$ operational amplifier made by Fairchild Camera and Instrument Corporation of Sunnyvale, California. The junction point of the T-networks is connected to the negative input of the amplifier. The output of amplifier 57 is connected to the output terminal of the network. The positive input of the amplifier is connected to ground through a resistance. Noting that the potential of the negative input terminal of the amplifier is at essentially ground potential, the impedance of T-network 55 may be represented by the following relationship:

$$Z_{in} = \frac{2R_1\left[\left(R_2+\frac{R_1}{2}\right)C_1 s + 1\right]}{R_2 C_1 s + 1} \quad (1)$$

where $R_1$, $R_2$ and $C_1$ are resistance and capacitance values of resistors and capacitors adjacent which they appear and $s$ is the complex operator or variable. Similarly, the impedance of the T-network 56 may be represented by the following relationship:

$$Z_o = \frac{2R_3\left[\left(R_4+\frac{R_3}{2}\right)C_2 s + 1\right]}{R_4 C_2 s + 1} \quad (2)$$

where $R_3$, $R_4$ and $C_2$ are resistance and capacitance values of the resistors and capacitors adjacent which they appear in FIG. 1, and $s$ is the complex operator. Also noting that $$\frac{e_{in}}{Z_{in}} + \frac{e_o}{Z_o} = 0 \quad (3)$$

where $e_{in}$ is the input voltage to the phasing network 51 and $e_o$ is the output from the phasing network 51. Accordingly, $$\frac{e_o}{e_{in}} = -\frac{Z_o}{Z_{in}} = -\frac{R_3\left[\left(R_4+\frac{R_3}{2}\right)C_1 s + 1\right](R_2 C_1 s + 1)}{R_1(R_4 C_2 s + 1)\left[\left(R_2+\frac{R_1}{2}\right)C_1 s + 1\right]} \quad (4)$$

Let $$T_{1s} = R_2 + \frac{R_1}{2} C_1$$

$$T_{2s} = R_2 C_1$$

$$T_{3s} = R_4 + \frac{R_3}{2} C_2$$

and $$T_{4s} = R_4 C_2$$

Noting that ratio $R_3/R_1$ is a gain or attenuation factor, the transfer function of network is as follows:

$$G_{(s)} = \frac{(1+T_{2s})(1+T_{3s})}{(1+T_{1s})(1+T_{4s})} \quad (5)$$

The relationship of equation (5) is also true for network 50 where $$T_{1m} = \left(R^6 + \frac{R_5}{2}\right)C_4$$

$$T_{2m} = R_6 C_4$$

$$T_{3m} = \left(R_9 + \frac{R_7}{2}\right)C_5$$

and $$T_{4m} = R_9 C_5$$

where $R_5$, $R_6$, $R_7$, $R_9$ are resistance and capacitance values of the resistors and capacitors adjacent which they appear in FIGURE 1.

Figure 2:
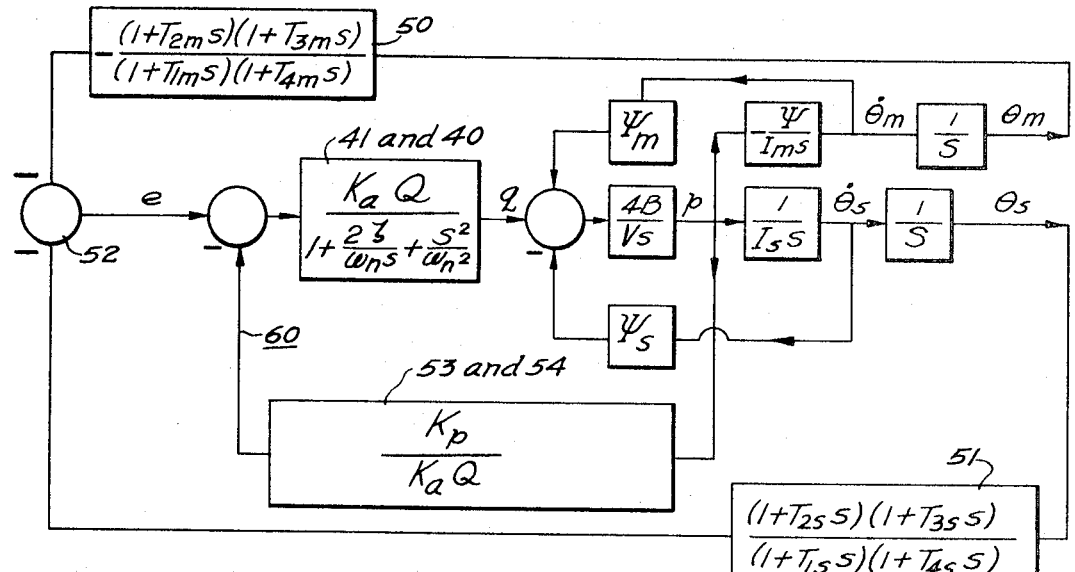
FIG. 2 is a block diagram of the system of FIG. 1 indicating the input-output transfer characteristics of the components thereof and the signal flows therebetween.

Reference is now made to FIG. 2 which shows a block diagram of the bilateral servosystem shown and described in connection with FIG. 1. The blocks of FIG. 2 corresponding to components of FIG. 1 are designated by the same numeral. Within each block the transfer function thereof is represented in Laplace transform form. Also indicated are the signal flow paths of the various hydraulic, electrical and mechanical signals appearing in the system. In the block diagram symbols are defined as follows:

$s$ is the complex variable of the Laplace transform functions.

$e$ is the electrical error signal appearing at the output of the master and slave phasing networks.

$K_a$ is the gain of the current amplifier 41.

$Q$ is the gain of the flow control valve 40.

$K_p$ is the reciprocal of zero load pressure droop.

$\omega_n$ is a natural resonant frequency of the flow control valve 40.

$\zeta$ is the damping factor of the flow control valve.

$q$ represents fluid flow.

$B$ is fluid bulk modulus.

$V$ is the entrained fluid volume of the system.

$p$ is the pressure differential at the output ports of the flow control valve.

$\Psi_s$ is the lever arm $r_s$ of the slave member times the piston area of the slave actuator and is referred to as the slave torque constant.

$I_s$ is the rotational inertia of the slave member.

$\theta_s$ is the displacement of the slave member about the pivotal axis or the angular displacement of the axis of the slave member from the reference axis.

$\theta_m$ is the displacement of the axis of the master member from the reference axis.

$I_m$ is the rotational inertia of the master member.

$\Psi_m$ is the product of the lever arm $r_m$ of the master member times the piston area of the master actuator and is referred to as the master torque constant.

$K_p/K_aQ$ is the reciprocal of the pressure gain of either master or slave loop.

$K_aQ/s$ is the reciprocal of slew error of the system at one radian per second.

Figure 3:
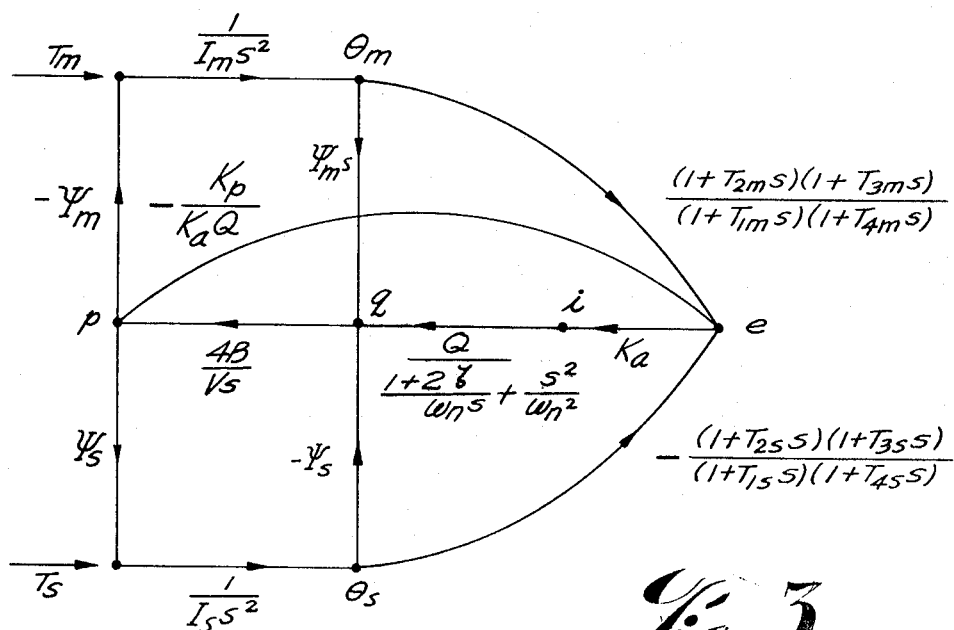
FIG. 3 is a signal flow diagram of the block diagram of FIG. 2.

Reference is now made to the signal flow diagram of FIG. 3 which shows essentially the same information as shown in the block diagram of FIG. 2 except in signal flow form for an explanation of the operation of the system of FIG. 1. The various symbols utilized therein have the same meaning as FIG. 2. $i$ represents current at the output of the current amplifier 41. Initially let it be assumed that the two phasing networks 50 and 51 described in the block diagram of FIG. 2 and also in FIG. 1 are not included in the system. An angular displacement $\theta_m$ of the master member 12 will produce an error signal $e$ at the input of the amplifier 41. The signal is amplified by the gain factor $K_a$ and appears as a current $i$ at the output thereof. The control valve 40 amplifies the input thereto by a factor of $Q$ and the output appears as fluid flow $q$. Such flow develops a pressure differential $p$ in the system. The pressure differential applied to the linear actuator 23 is converted into a $T_s$ torque on the slave member by the factor $\Psi_s$. The torque $T_s$ produced by the linear actuator causes the slave member to be angularly displaced by $\theta_s$ in a direction to produce an alignment of the axis 17 of the slave member with the axis of the master member 12 and thereby reduce the error signal $e$ to the input of the amplifier to zero.

In order for the slave member 15 to support and move large loads, it is necessary to provide high amplification in the error signal amplification channel including blocks 40 and 41, that is, the produce of the factors $K$ and $Q$ must be large in order for the axis 17 of slave member to be aligned in a direction close to the direction of the alignment of the axis 12 of the master member even under heavy loads or when large torques are being applied by the slave member. Such a condition is referred to as compliance and is defined as the desynchronization of the slave member with respect to the master member to support a particular load, or desynchronization to develop full pressure differential at the output of the control valve. When such high amplification is provided, instabilities are created in the slave loop. To eliminate such instability a feedback loop 60 from the pressure output point to the error signal input point of the signal amplification channel is provided. The provision of high gain in the common portion of the master and the slave loops, and in particular high gain from the input to the amplifier 41 to the pressure output ports of the valve 40, and in addition, utilization of a high torque reflection ratio represented by the ratio of $\Psi_s$ to $\Psi_m$, results in a much higher gain in the master loop than in the slave loop.

Figure 4:
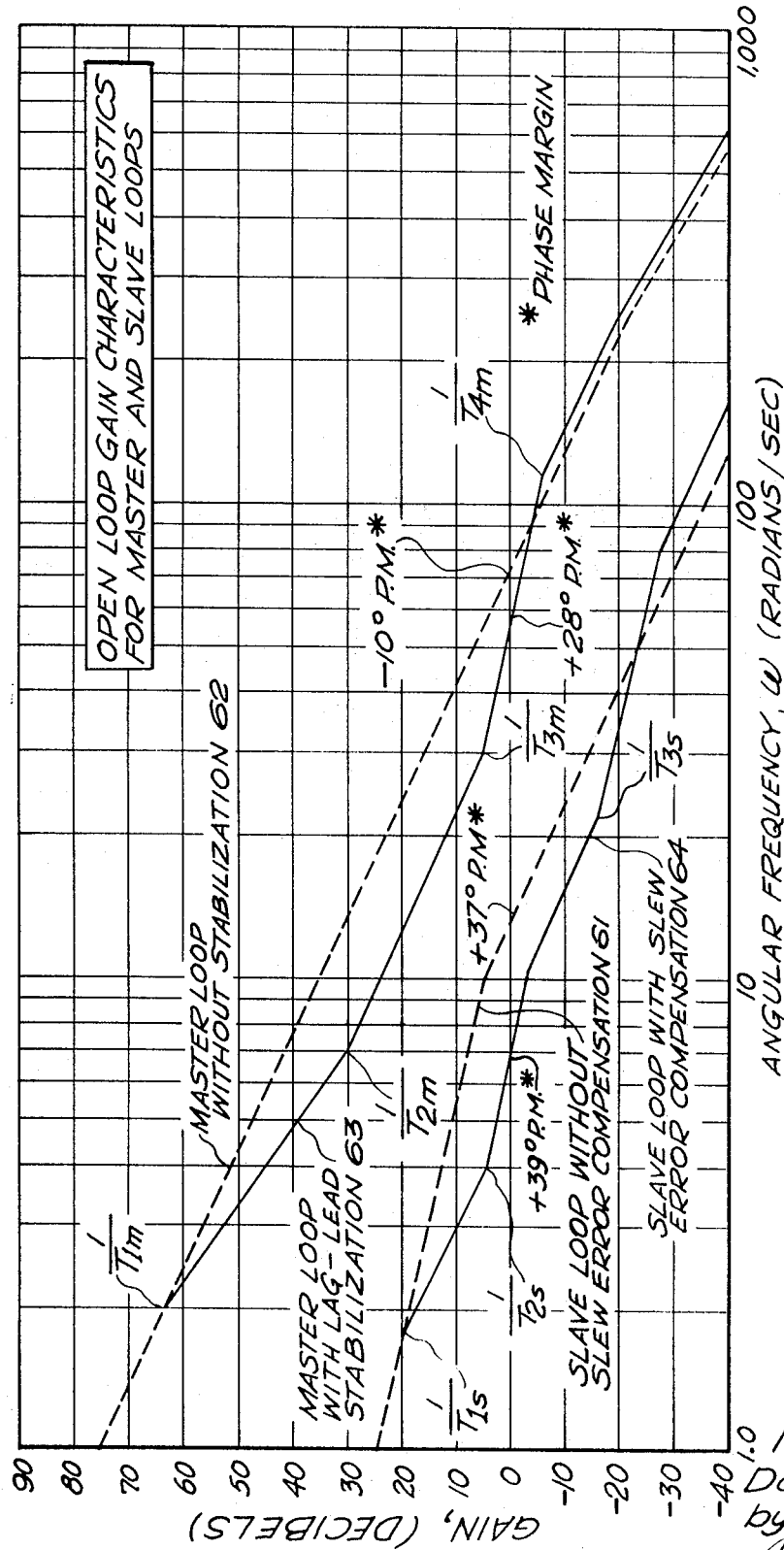
FIG. 4 shows graphs of open loop gain versus frequency of the slave and master loops of a system useful in explaining the operation of the invention.

A loop with such high gain is stabilized by the provision of a lead-lag phasing network 50 between the mechanical displacement signal $\theta_m$ and the input to the current amplifier 41. The phasing network stabilizes the master loop as will be explained more particularly in connection with the example of FIGURE 4. However, while stabilizing the master loop, the phasing network introduces an undesired slew error component in the slave loop, that is as the master member is moved at a particular rate, the slave member moves at a corresponding rate but displaced angularly in orientation from the slave by a large angular displacement. Such a condition is objectionable for a number of applications such as in manipulator apparatus. To minimize or to compensate for such slew error without affecting the stability of the system, a lead-lag phasing network 51 is provided in the slave loop in the signal circuit between the displacement signal $\theta_s$ and the error signal $e$ applied to the amplifier. Provision of the lead-lag network has the effect of eliminating slew error or minimizing slew error and even can be used to overcompensate slew error, that it to cause a slave member to lead the master member. It also can be used to compensate for low gain ($K_aQ$) in the common amplification channel of the master and slave loops.

The manner of the operation of the invention will be further understood from the following analysis. The error signal E as a function of the complex variable $s$ can be expressed as follows:

$$E = [G_s(s)\,\theta_s - G_m(s)\,\theta_m] \quad (6)$$

where $G_s(s)$ is the transfer characteristic of the slave loop, $G_m(s)$ is the transfer characteristic of the master loop, $\theta_s$ is the angular displacement of the slave member as a function of $s$, and $\theta_m$ is the angular displacement of the master member as a function of $s$. For a constant slew rate Since
$$\dot\theta_s = \dot\theta_m = \dot\theta_o \quad (7)$$

$$\theta_s = \frac{1}{s}\dot\theta_s,$$

and letting
$$\dot\theta_s = \frac{1}{s}\dot\theta_o$$

where $\dot\theta_o$ is a specific angular velocity, $$\theta_s = \frac{1}{s^2}\dot\theta_o, \quad (8)$$

and also
$$\theta_m = \frac{1}{s^2}\dot\theta_o \quad (8a)$$

Substituting Equations (8) and (8a) in Equation (6)

$$E = \frac{\dot\theta_o}{s^2}[G_s(s) - G_m(s)]$$

or
$$\frac{E}{\dot\theta_o} = \frac{1}{s^2}[G_s(s) - G_m(s)] \quad (9)$$

From block diagram of FIG. 2 or signal flow diagram of FIG. 3

$$G_s(s) = \frac{(1+T_{2s}s)(1+T_{3s}s)}{(1+T_{1s}s)(1+T_{4s}s)} \quad (10)$$

and
$$G_m(s) = \frac{(1+T_{2m}s)(1+T_{3m}s)}{(1+T_{1m}s)(1+T_{4m}s)} \quad (11)$$

where $T_{1s}$, $T_{2s}$, $T_{3s}$ and $T_{4s}$ are the time constants of the network 51 in the slave loop and $T_{1s} > T_{2s} > T_{3s} > T_{4s}$. Where $T_{1m}$, $T_{2m}$, $T_{3m}$, $T_{4m}$ are the time constants of the network 50 in the master loop and $T_{1m} > T_{2m} > T_{3m} > T_{4m}$. Substituting equation (10) and equation (11) into equation (9) and simplifying the resultant expression:

$$\frac{E}{\dot\theta_o} = \frac{1}{s^2}\left[ s\frac{(T_{2s}+T_{3s}+T_{1m}+T_{4m}-T_{2m}-T_{3m}-T_{1s}-T_{4s})+s^2(\ )+s^3(\ )+s^4(\ )}{1+s(\ )+s^2(\ )+s^3(\ )+s^4(\ )} \right] \quad (12)$$

Applying the Final Value Theorem which states that, $$\lim_{s \to 0} s\frac{E}{\theta_o} = \lim_{t \to \infty} \frac{e}{\theta_o}$$

to the Laplace Transform of equation (12)

$$e/\dot{\theta}_o T_{1m} - T_{1s} - T_{2m} + T_{2m} - T_{3m} + T_{3s} + T_{4s} - T_{4s} \quad (13)$$

where

*e* is the error signal as a function of time, and $\dot{\theta}_o$ is a specific angular velocity. The ratio $e/\dot{\theta}_o$ of equation (13) is slew error produced by the networks 51 and 50 of equations (10) and (11), respectively. The slew error of the system without networks 51 and 50 is $\Psi_s/K_aQ$. Accordingly, the total slew error can be represented by the relationship:

$$\frac{e}{\dot{\theta}_o} = \frac{\psi s}{K_a Q} + T_{1m} - T_{1s} - T_{2m} - T_{3m} + T_{3s} + T_{4s} - T_{4s} \quad (14)$$

Total slew error can be reduced to zero by setting equation (14) equal to zero. Not only does setting such a condition compensate for slew error produced by master network 50 but also compensates for the slew error inherent in the system design without compensating networks. $T_{1s}$ and $T_{2s}$ are chosen so that $$T_{1s} - T_{2s} = T_{1m} - T_{2m} - T_{3m} + T_{3s} + T_{4m} - T_{4s} + \frac{\psi_s}{K_a Q}$$

(15)

In addition as both $T_{1s}$ and $T_{2s}$ affect stability, the ratio of $T_{1s}/T_S$ IS CHOSEN NEAR UNITY) Note that $$T_1 - T_{2s} = \frac{R_1 C_1}{2}$$

from the equations following Equation 4 above, and that $$\frac{T_{1s}}{T_{2s}} = 1 + \frac{1}{2}\frac{R_1}{R_2}.$$

Accordingly, as $R_2$ is made larger than $R_1$, $T_{2s}$ comes closer to $T_{1s}$.

In addition, the time constants $T_{1s}$ and $T_{2s}$ are preferably selected so that the reciprocals thereof lie intermediate the unity angular frequency ordinate and the frequency of crossover of the unity gain axis by the open loop gain versus frequency graph of the slave loop. With the reciprocals close to the unity angular frequency ordinate the gain of the slave loop would be reduced appreciably and render the loop sluggish. With the reciprocals close to the crossover frequency, stability of the slave loop would be affected.

A typical design for the bilateral servosystem of FIG. 1 suitable for use in a manipulator, such as for example described in a copending patent application Ser. No. 33,442,314, filed Apr. 30, 1970 and assigned to the assignee of the present application, will now be described in connection with the graphs of FIG. 4. The graphs are open loop gain versus frequency responses of the master and slave loops with and without the various phasing networks described in connection with FIG. 3. The following are the physical parameters of the design:

6 percent slew error (6 percent of a radian to produce a slew of 1 radian per second
$I_s$=6,500 in.-lb. sec.²
$I_m$=2.2 in.-lb. sec.²
$\Psi_s$=45 in.³/radian
$\Psi_m$=0.45 in.³/radian
V=85 in.³
B=200,000 lbs.-in.⁻²

$$\frac{K_aQ}{\psi_s} \geq \frac{1}{\text{slew error of 6\%}} = \frac{1}{0.6} = 16.67 = 24.5 \text{ db}$$

$$\frac{K_aQ}{K_\rho} = 18,800 \frac{\text{lb.}}{\text{in.}^2 \text{ radian}}$$

The dotted graph 61 represents the gain vs. frequency characteristic of the slave loop without slew error compensation. The phase margin at the crossover of the graph of the unity gain axis has positive value of +37° as indicated and the slave loop is stable. The open loop gain versus frequency characteristic of the master loop without stabilization is as shown in dotted graph 62. At the crossover of the unity gain axis the phase margin has negative value of −10° and accordingly is unstable. The solid graph 63 shows the modification of the open loop response of the master loop with lead-lag stabilization introduced. The lag time constants $T_{1m}$ and $T_{4m}$ and the lead time constants $T_{2m}$ and $T_{3m}$ of the network 50 have the values indicated on the graph. The phase margin at unity gain crossover has a positive value of +28° as indicated. Accordingly, the master loop is stable. Such stabilization of the master loop however introduces slew error or augments the slew error represented by the reciprocal of the value of gain at a frequency of one radian per second. To eliminate or minimize such slew error the phasing network 51 and the relationships set forth in equation (15) are utilized. The longest lag and lead time constants $T_{1s}$ and $T_{2s}$, respectively, are selected with the lag time constant greater than the lead time constant to produce breaks in the open loop response of the slave loop so as not to affect the stability of the response of the slave loop, that is, each of the time constants $T_{1s}$ and $T_{2s}$ are selected to be large in relation to the reciprocal of the crossover frequency at unity gain of the open loop response. The reciprocals of $T_{1s}$ and $T_{2s}$ are preferably close to one another and are intermediate unity frequency and unity gain crossover frequency. Solid graph 64 shows the modification of the open loop gain characteristic of the slave loop utilizing the relationship set forth in equation (15). In this graph the lag time constants $T_{1s}$ and $T_{4s}$ and the lead time constants $T_{2s}$ and $T_{3s}$ have the values indicated on the graph. Accordingly, it is apparent that slew error introduced by network 50 is eliminated by network 51 without affecting the stability of master and slave loops. As phase margin at unity gain crossover of graph 64 is +39° the slave loop is stable. If desired the slew error represented by the factor $\Psi_s/K_aQ$ could have been as well compensated for.

While I have shown a particular embodiment of my invention, it will of course be understood that I do not wish to be limited thereto since many modifications may be made in the structural arrangement shown and in the instrumentalities employed. I contemplate by the appended claims to cover any such modifications as fall within the true spirit and scope of my invention.

What I claim as new and desire to secure by Letters Patent of the United States is:

1. A bilateral servosystem comprising
   a master member having an axis aligned coaxial with a predetermined axis,
   an electromechanical transducer mechanically coupled to said master member to produce an electrical output in accordance with the change in orientation of the axis of said master in relation to said predetermined axis,
   a slave member having another axis aligned coaxial with another predetermined axis corresponding to said one predetermined axis,
   another electromechanical transducer mechanically coupled to said slave member to produce an electrical output in accordance with the change in orientation of the axis of said slave member in relation to said other predetermined axis,
   the outputs from said slave transducer being matched to the outputs of said master transducer such that an output from said master transducer corresponding to a predetermined displacement of the axis of said master member from said one predetermined axis is equal to the output from said slave transducer corresponding to the same predetermined displacement of the axis of the slave member from said other predetermined axis,
   a slave servo loop including an electrical amplifier, a servo flow control valve and a slave actuator responsive to a difference in outputs of said transducers for maintaining said slave member axis in alignment with said master member axis, a master servo loop including said electrical amplifier, said servo flow control valve and a master actuator connected between the output of said valve and said master member in a polarity to oppose the movement of said master member which causes movement of said slave member, the inertia of said slave member being substantially greater than the inertia of said master member, the phase margin of said servo loop being positive at the frequency at which open loop gain is unity, the gain at frequencies below said frequency being sufficiently high to provide small compliance error, the open loop gain of said master servo loop being substantially higher than open loop gain of said slave servo loop, means for stabilizing said master loop including in circuit between said master member and said master transducer a network which introduces phase lag in the signal over a low frequency range and which introduces phase lead in the signal over a higher frequency range whereby the phase margin of said master loop at the frequency of crossover of the gain versus frequency characteristic of the master loop at unity gain is positive, and means for minimizing slew error of the system including a network in the slave loop in circuit between said slave member and said slave transducer having at least a lag time constant and a lead time constant which introduces a phase lag and a phase lead in the signal over a low-frequency range, said phase lag time constant being greater than said phase lead time constant of said network, each of said time constants being greater than the reciprocal of the frequency at unity open loop gain of the slave loop.

2. The combination of claim 1 in which said phase lag and phase lead time constants of said network of said slave loop are close to one another.

3. The combination of claim 1 in which said phase lag and phase lead time constants of said network of said slave loop are in the center of the band of frequencies from zero to the unity gain crossover frequency of the slave loop.

4. The combination of claim 1 in which the net phase lag component of said phase lag and said phase lead time constants of said network of said slave loop is equal to the net phase lead component of the other phase lead and phase lag time constants of said networks of said master and said slave loops.

5. The combination of claim 1 in which the net phase lag component of said phase lag and said phase lead time constants of said network of said slave loop is equal to the sum of the factor $\Psi_s/K_nQ$ and the net phase lead component of the other phase lead and phase lag time constants of said networks of said master and said slave loops.

* * * * *